United States Patent [19]

Matushiro et al.

[11] Patent Number: 4,467,608
[45] Date of Patent: Aug. 28, 1984

[54] CONTROL METHOD AND APPARATUS FOR AN INTERNAL COMBUSTION ENGINE WITH A TURBOCHARGER

[75] Inventors: Ryuichi Matushiro, Okazaki; Koichi Moriguchi, Nagoya; Kenzi Iwamoto, Nishio; Hisasi Kawai, Toyohashi; Nobutaka Mizuno; Yasuhiro Ikuta, both of Okazaki, all of Japan

[73] Assignees: Nippon Soken, Inc., Nishio; Toyota Jidosha Kogyo Kabushiki Kaisha, Toyota, both of Japan

[21] Appl. No.: 376,134

[22] Filed: May 7, 1982

[30] Foreign Application Priority Data

May 8, 1981 [JP] Japan .................................. 56-69961

[51] Int. Cl.³ ............................................. F02B 37/12
[52] U.S. Cl. ...................................................... 60/602
[58] Field of Search ................. 60/600, 601, 602, 603, 60/611; 123/564

[56] References Cited

U.S. PATENT DOCUMENTS 1,856,024  4/1932  Buchi ...................................... 60/603
2,670,724  3/1954  Reggio .............................. 123/425 X
3,173,242  3/1965  Erickson ................................ 60/601

FOREIGN PATENT DOCUMENTS 54-42529  4/1979  Japan ........................................ 60/611

Primary Examiner—Michael Koczo
Attorney, Agent, or Firm—Cushman, Darby & Cushman

[57] ABSTRACT

An internal combustion engine equipped with a supercharger including a bypass passage avoiding a turbine and disposed in parallel to an exhaust pipe, and a bypass valve mounted in the bypass passage for controlling the flow rate of exhaust gas flowing through the exhaust pipe. A control method for the internal combustion engine equipped with a supercharger wherein an air intake is compressed by a compressor coaxially connected to the turbine driven by exhaust gas flowing in the exhaust pipe to supply a supercharger pressure to the engine; the temperature of exhaust gas flowing into a casing of the turbine is sensed by a temperature sensor; and the pressure of the air intake supplied to the engine as the supercharger pressure is controlled when the temperature sensor produces a signal, to thereby keep the temperature of the exhaust gas at a level below a predetermined value.

3 Claims, 2 Drawing Figures

4,467,608

CONTROL METHOD AND APPARATUS FOR AN INTERNAL COMBUSTION ENGINE WITH A TURBOCHARGER

BACKGROUND OF THE INVENTION

This invention relates to a control method and apparatus for an internal combustion engine equipped with a supercharger, and more particularly it is concerned with an improved method and apparatus of controlling supercharged pressure to an optimum level in accordance with the exhaust temperature to thereby prevent thermal rupture of the supercharger and the elements of the exhaust system and reduce fuel consumption.

Generally, in an internal combustion engine equipped with a supercharger, air shows a rise in temperature due to compression of the air by the supercharger for supply to the engine, and in order to achieve the effect of supercharging by raising the supercharged pressured at the low engine speed range, the area of the nozzle for the exhausts to flow into the turbine casing is reduced as much as possible, so that the exhaust pressure rises particularly in the high engine speed range. This tends to cause knocking to occur if ordinary gasoline fuel is used. To avoid this phenomenon, it is usual practice to operate the engine at high speed and under high load by setting the ignition time at a point much delayed than the minimum spark advance for best torque which suits the air and fuel supplied to the combustion chamber. This has resulted in the temperature of the exhausts rising to an inordinately high level and the supercharger and the elements of the exhaust system being exposed to the heat of high temperature, thereby causing the risk of thermal rupture to occur in them. Also, the engine output has been restricted by knocking, and fuel consumption has been adversely affected.

To obviate this problem, proposals have hitherto been made to increase an ignition delay required for initial stage combustion in the combustion process to thereby delay the occurrence of knocking, to use fuel of high ignition delay in place of ordinary gasoline, and to incorporate an additive, such as tetraethyl lead, or fuel (of the benzol or alcohol system) of high antiknocking ability in the ordinary gasoline. Also, to accomplish the same object, programs have been under way to reduce compression ratio to keep the pressure and temperature of the end gas as low as possible in the combustion process, to introduce variable compression ratio, and to use a swirl producing construction for the combustion chamber to increase flame velocity, so as to delay the knocking producing ignition time.

Some disadvantages are associated with the aforesaid proposals. The use of other fuel than ordinary gasoline is not desirable so long as gasoline engines are concerned. Avoidance of air pollution by engine exhausts takes priority over an improvement of engine performance, so that the incorporation of tetraethyl lead in the gasoline should be avoided. The incorporation in ordinary gasoline of antiknocking fuel makes it necessary to use specific equipment, thereby increasing cost.

In view of the situation described hereinabove, it is considered advisable to control the supercharged pressured in an internal combustion engine equipped with a supercharger in such a manner that the supercharged pressure is kept at a predetermined level when the engine operates at high speed and under high load. It is also considered advisable that when the aforesaid control is effected, the air-fuel ratio of the mixture is set at a level at which the mixture is substantially enriched to shift the knock limit to the advance side so that the exhaust temperature limit may not be exceeded, to thereby obtain an exhaust gas temperature drop and improved engine power. In this case, there is the risk that fuel consumption might be adversely affected by setting the air-fuel ratio in a manner to enrich the mixture. Also, depending on how the supercharged pressure is controlled, thermal rupture of the supercharger mounted in the exhaust system and the elements of the exhaust system might result.

SUMMARY OF THE INVENTION

This invention has been developed for the purpose of obviating the aforesaid disadvantages of the prior art. Accordingly an object of the invention is to provide a supercharged pressure control method capable of controlling supercharged pressure to bring it to an optimum level in accordance with an exhaust temperature of the engine in such a manner that the supercharger and the elements of the exhaust system may not be exposed to a heat exceeding the level to which they are resistant, to thereby positively avoid thermal rupture thereof and keep the mixture from being excessively enriched, to thereby improve fuel consumption.

More specifically, the temperature of exhaust gas flowing into the turbine casing is sensed, and the supercharged pressure is controlled in such a manner that the temperature of the exhaust gas is maintained at a level lower than a predetermined value, to thereby avoid thermal rupture of the supercharger and the elements of the exhaust system and to improve fuel consumption by avoiding excessive enriching of the air-fuel mixture.

Another object is to provide a supercharged pressure control method wherein the exhaust gas flowing into the turbine casing is increased or decreased in amount to thereby control the pressure of air.

Still another object is to provide a supercharged pressure control method wherein the temperature of the exhaust gas is sensed to determined whether it is higher or lower than the predetermined value, so as to control the supercharged pressure by calculating an increment or decrement of the supercharged pressure on the basis of the temperature differential.

Still another object is to provide a supercharger apparatus wherein a bypass passage avoiding the turbine is provided and a bypass valve is mounted in the bypass passage, to thereby control the amount of exhaust gas flowing through the turbine.

DESCRIPTION OF THE PREFERRED EMBODIMENT

Figure 1:
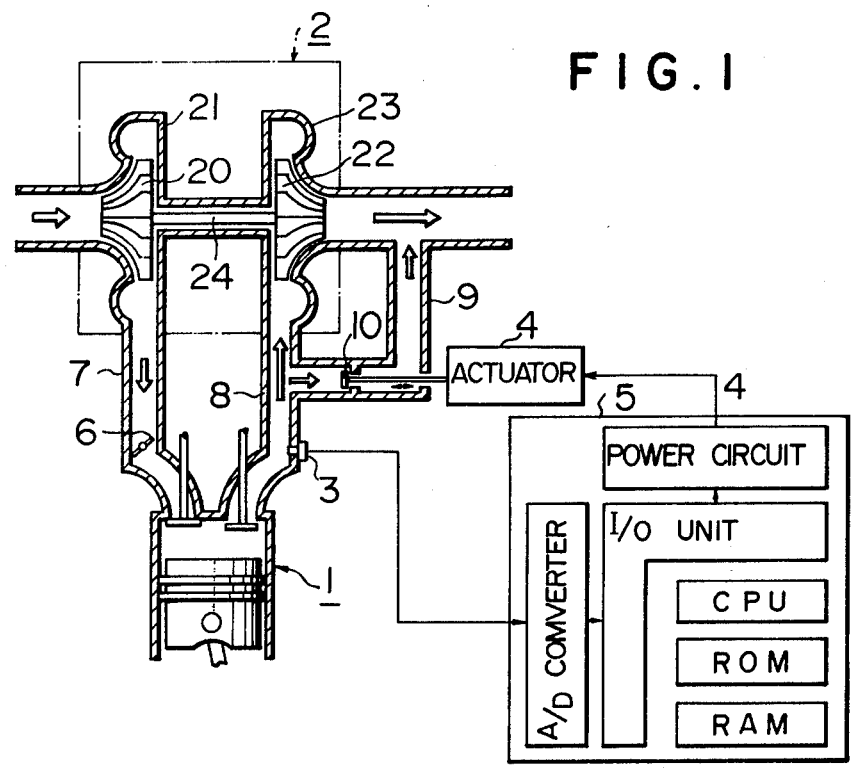
FIG. 1 is a schematic view of one embodiment of the invention.

The invention will now be described by referrring to a preferred embodiment thereof shown in the accompanying drawings. FIG. 1 shows the manner in which control of the supercharged pressure is effected according to one embodiment of the invention. In the figure, the numeral 1 designates an internal combustion engine, and the numeral 2 a supercharger driven by exhaust gas. The supercharger 2 comprises a compressor 20, a compressor casing 21, a turbine 22 and a turbine casing 23, the compressor 20 and turbine 22 being interconnected by a shaft 24. The turbine 22 is driven for rotation by exhaust gas flowing through an exhaust pipe 8, and the compressor 20 supplies air to the engine as a supercharged pressure after compressing same. The numeral 3 designates an exhaust temperature sensor, such as a thermocouple, for sensing the temperature of the exhaust gas, and the numeral 4 an actuator for actuating a bypass valve 10 to reduce or increase the supercharged pressure by permitting a portion of the exhaust gas to flow to the downstream side of the turbine 22 through a bypass passage 9. The actuator 4 may comprise a linear solenoid, pulse motor, etc. The numeral 5 designates a control circuit, such as a microcomputer, which is operative to calculate an increment or a decrement of the supercharged pressure to keep the temperature of the exhaust gas at a level below the predetermined value, to thereby control the supercharged pressure actuator 4. The numerals 6 and 7 designate a throttle valve and a suction conduit respectively.

Figure 2:
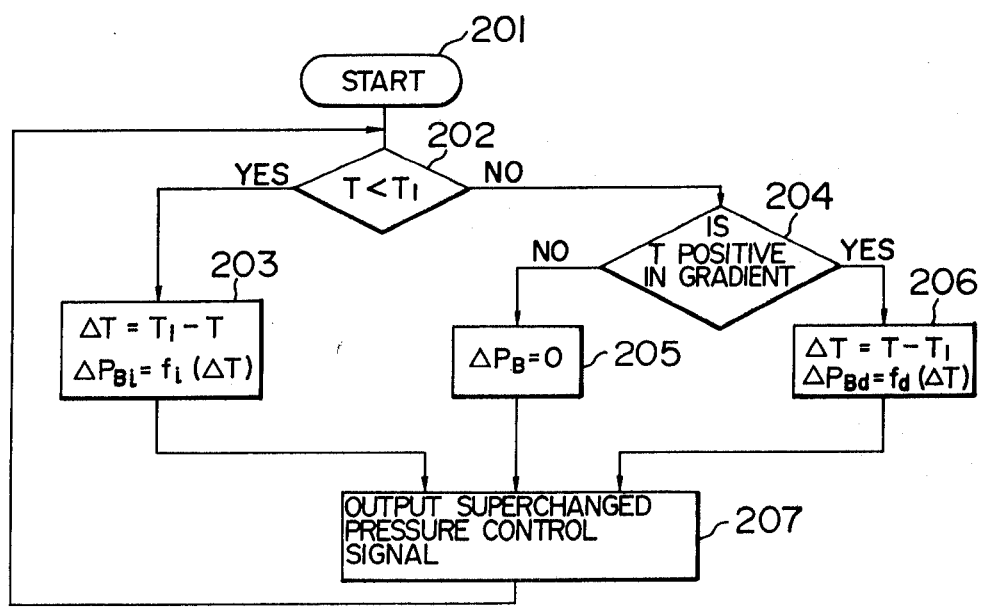
FIG. 2 is a flow chart showing the process in which calculation is done in the control circuit shown in FIG. 1 for controlling the supercharged pressure.

FIG. 2 is a flow chart showing the process in which calculation is done in the control circuit 5. The control circuit 5 comprises an AD converter, CPU, ROM, RAM, I/O unit and power circuit connected together as by a bus. Startup of the internal combustion engine 1 gets the program starting as indicated at 201. In step 202, it is decided whether or not a temperature T of the exhaust gas sensed by the exhaust gas temperature sensor 3 is less than a predetermined value T1($\approx$900° C.). When the sensed temperature T is less than the predetermined value T1, the process proceeds to step 203; when the sensed temperature T is more than the predetermined value T1, the process proceeds to step 204. T<T1 corresponds to the engine operating at low or medium speed and under low or medium load, and T$\geq$T1 corresponds to the engine operating at high speed and under high load. In step 203, an increment $\Delta P_{Bi} = fi(\Delta T)$ of the supercharged pressure corresponding to $Ti - T = \Delta T$ is obtained by a map or by calculation, and in step 207 a supercharged pressure control signal corresponding to the increment $\Delta P_{Bi}$ is supplied to the supercharged pressure actuator 4. In step 204, it is decided whether the temperature T of the exhaust gas has a positive or negative gradient with lapse of time. When the gradient is found negative, the process proceeds to step 205 where the increment $\Delta P_B$ of the supercharged pressure is rendered zero (0), before the process proceeds to step 207. When the gradient is found positive, the process proceeds to step 206 in which a decrement $\Delta P_{Bd} = fa(\Delta T)$ corresponding to $T - T1 = \Delta T$ is calculated before the process proceeds to step 207 in which a supercharged pressure control signal is supplied to the actuator 4. After step 207 is performed, the process returns to step 202 in which the temperature of the exhaust gas is sensed again. Thereafter the aforesaid operation is performed in cycle. In this way, the temperature of the exhaust gas is maintained at a level below the predetermined value.

Control of the supercharged pressure may be effected by releasing a portion of the compressed air intake to the upstream side or exhaust side of the compressor.

What is claimed is:

1. A control method for an internal combustion engine equipped with a supercharger having a turbine in a turbine casing driven by exhaust gas and a compressor in a compressor casing connected to the turbine comprising the steps of:

compressing air by the compressor and supplying it to the engine;

sensing the temperature of the exhaust gas flowing into the turbine casing;

controlling the pressure of the supercharged air in response to the detected temperature so as to maintain the temperature of the exhaust gas at a level below a predetermined value, deciding whether or not the sensed temperature is less than said predetermined value;

calculating an increment of the supercharged pressure with respect to the temperature differential when the sensed exhaust gas temperature is less than the predetermined value;

deciding whether or not the temperature has a positive gradient with respect to elapsed time when the sensed exhaust gas temperature is more than the predetermined value;

calculating a value for maintaining the supercharged pressure when the temperature does not have a positive gradient;

calculating a decrement of the supercharged pressure when the temperature has a positive gradient; and producing a supercharged pressure control signal for one of said calculation steps to control said supercharged pressure.

2. A method as claimed in claim 1, wherein the pressure of the air is controlled by increasing or decreasing the amount of the exhaust gas flowing into the turbine casing.

3. A supercharger apparatus for an internal combustion engine comprising a turbine driven by exhaust gas, and a compressor coaxially connected to the turbine for compressing an air to supply supercharged air to the engine, wherein the improvement comprises:

a bypass passage bypassing said turbine;

a bypass valve mounted in said bypass passage for controlling the flow of the exhaust gas;

an exhaust gas temperature sensor for exhaust gas flowing into said turbine of said supercharger;

a actuator for driving said bypass valve; and a control circuit for operating said actuator in response to the signal of said temperature sensor to keep the exhaust gas temperature less than a predetermined value, wherein said control circuit comprises means including an AD converter, CPU, ROM, RAM, I/O unit and power circuit for deciding whether or not the temperature of the exhaust gas sensed by said exhaust gas temperature sensor is less than a predetermined value and when the sensed temperature is less than the predetermined value, calculating an increment of the supercharged pressure and in an output supercharged pressure control signal step supplying to said actuator a supercharged pressure control signal corresponding to the increment, but when the sensed temperature exceeds said predetermined value deciding whether the temperature of the exhaust gas has a positive or negative gradient with lapse of time and when the gradient is found negative, rendering the increment of the supercharged pressure zero before said output supercharged pressure control signal step; but when the gradient is found positive, calculating a decrement before said output supercharged pressure control signal step in which a supercharged pressure control signal is supplied to said actuator, and after said output supercharged pressure control signal step is performed, returning to sensing of the temperature of the exhaust gas again.

* * * * *